(12) United States Patent
Ku et al.

(10) Patent No.: US 8,725,778 B2
(45) Date of Patent: *May 13, 2014

(54) METHODS AND APPARATUS TO PROVISION NETWORK RESOURCE RECORDS

(75) Inventors: Bernard Ku, Austin, TX (US); James Forsyth, Royal Oak, MI (US); Paul A. Tomalenas, Alamo, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/545,264

(22) Filed: Jul. 10, 2012

(65) Prior Publication Data

US 2012/0278368 A1 Nov. 1, 2012

Related U.S. Application Data

(63) Continuation of application No. 11/874,765, filed on Oct. 18, 2007, now Pat. No. 8,239,422.

(51) Int. Cl.
*G06F 17/30* (2006.01)
(52) U.S. Cl.
USPC .......................................................... 707/803
(58) Field of Classification Search
USPC .......................................................... 707/803
See application file for complete search history.

(56) References Cited

U.S. PATENT DOCUMENTS

| | | | |
|---|---|---|---|
| 6,374,295 B2 | 4/2002 | Farrow et al. | |
| 6,594,254 B1 | 7/2003 | Kelly | |
| 6,654,216 B2 | 11/2003 | Horvath et al. | |
| 6,654,891 B1 | 11/2003 | Borsato et al. | |
| 6,748,057 B2 | 6/2004 | Ranalli et al. | |
| 6,769,031 B1 | 7/2004 | Bero | |
| 6,976,090 B2 | 12/2005 | Ben-Shaul et al. | |
| 7,027,582 B2 | 4/2006 | Khello et al. | |
| 7,260,207 B2 | 8/2007 | Marsico | |
| 7,440,444 B2 | 10/2008 | Nishida et al. | |
| 7,675,907 B2 | 3/2010 | Nishida et al. | |
| 8,451,716 B2 * | 5/2013 | MeLampy et al. | 370/224 |
| 2002/0016174 A1 * | 2/2002 | Gibson et al. | 455/464 |
| 2002/0090927 A1 | 7/2002 | Allande et al. | |
| 2002/0138649 A1 | 9/2002 | Cartmell et al. | |

(Continued)

OTHER PUBLICATIONS

Notice of Allowance issued by the United States Patent and Trademark Office in connection with U.S. Appl. No. 11/874,765 on Apr. 5, 2012 (14 pages).

(Continued)

*Primary Examiner* — Debbie Lee
(74) *Attorney, Agent, or Firm* — Hanley, Flight & Zimmerman, LLC

(57) ABSTRACT

Methods and apparatus to provision network resource records are described. An example method includes creating a statement representative of a plurality of numbers to be provisioned to a plurality of users via an iterative process; and, for each iteration of the iterative process, generating an instance of the statement to form a resource record by replacing a first character in a domain name segment of the statement with a first version of a respective one of the numbers; replacing a second character in a resource identifier segment of the statement with a second version of the respective one of the numbers different than the first version; and storing the instance of the statement as a resource record in connection with the respective one of the numbers.

20 Claims, 5 Drawing Sheets

(56) References Cited

U.S. PATENT DOCUMENTS

| | | |
|---|---|---|
| 2003/0074461 A1 | 4/2003 | Kang et al. |
| 2003/0229632 A1 | 12/2003 | Harris |
| 2004/0156394 A1 | 8/2004 | Westman |
| 2005/0182781 A1 | 8/2005 | Bouvet |
| 2006/0050862 A1* | 3/2006 | Shen et al. .................... 379/219 |
| 2006/0112176 A1 | 5/2006 | Liu et al. |
| 2006/0149760 A1 | 7/2006 | Keni et al. |
| 2007/0121794 A1 | 5/2007 | Migault et al. |
| 2007/0121879 A1 | 5/2007 | McGary et al. |
| 2008/0019356 A1 | 1/2008 | Marisco |
| 2008/0025316 A1 | 1/2008 | Zampiello et al. |
| 2008/0037757 A1 | 2/2008 | Ku et al. |
| 2008/0137832 A1 | 6/2008 | Heinze et al. |

OTHER PUBLICATIONS

Office action issued by the United States Patent and Trademark Office in connection with U.S. Appl. No. 11/874,765 on Jan. 11, 2011 (15 pages).

Communication issued by the United States Patent and Trademark Office in connection with U.S. Appl. No. 11/874,765 on Jan. 5, 2011 (4 pages).

Office action issued by the United States Patent and Trademark Office in connection with U.S. Appl. No. 11/874,765 on Jun. 21, 2010 (12 pages).

Office action issued by the United States Patent and Trademark Office in connection with U.S. Appl. No. 11/874,765 on Nov. 30, 2009 (10 pages).

* cited by examiner

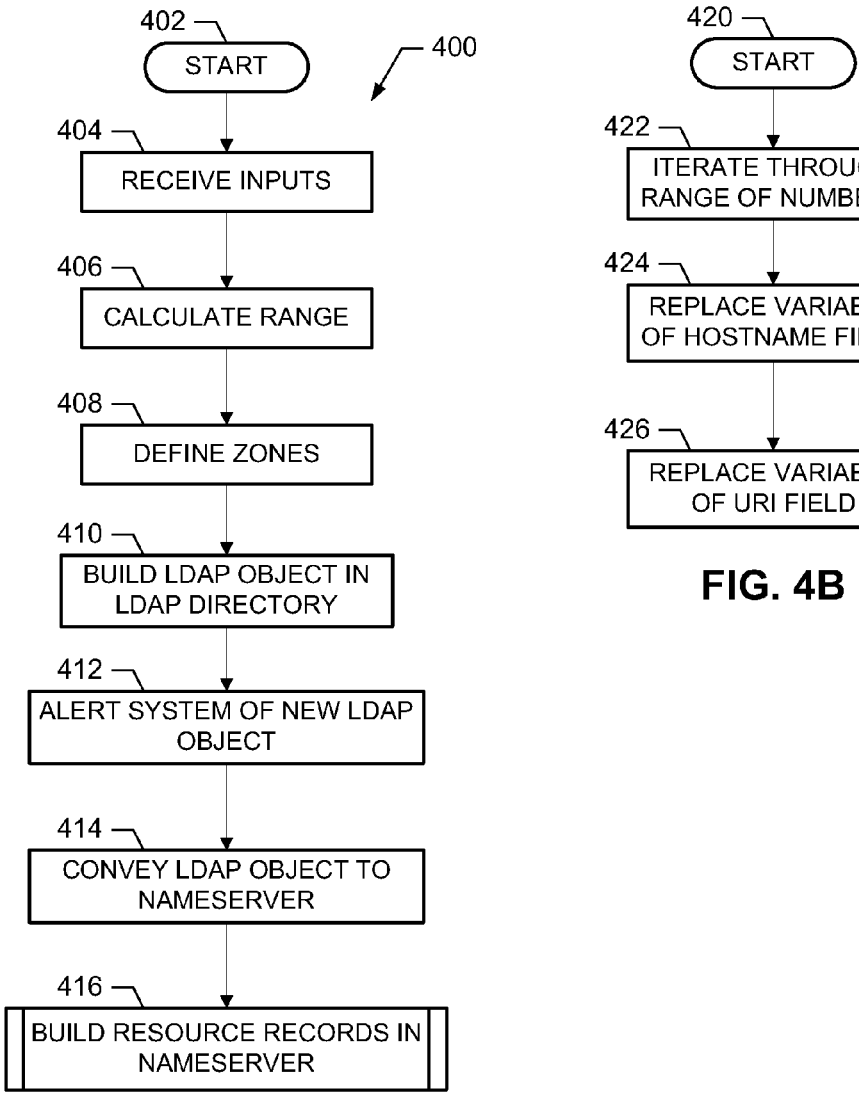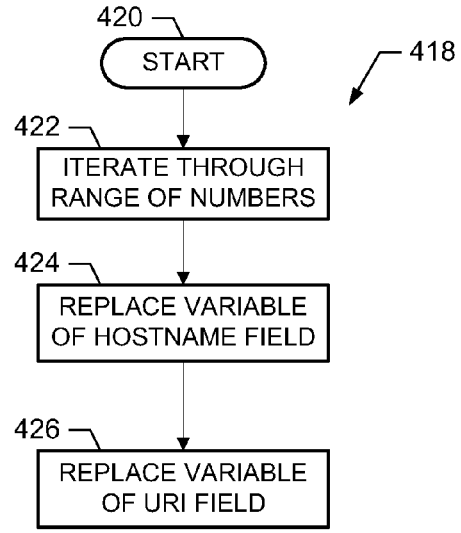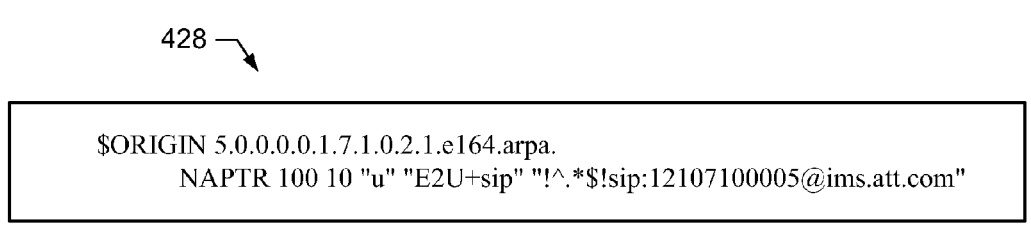
FIG. 4A
FIG. 4B
FIG. 4C

METHODS AND APPARATUS TO PROVISION NETWORK RESOURCE RECORDS

RELATED APPLICATION

This patent arises from a continuation of U.S. patent application Ser. No. 11/874,765, filed Oct. 18, 2007, now U.S. Pat. No. 8,239,422, which is hereby incorporated herein by reference in its entirety.

TECHNICAL FIELD

The present disclosure relates generally to data processing and management in a communication network, and more particularly, to methods and apparatus to provision network resource records.

BACKGROUND

Network carriers (hereinafter "carrier" or "carriers") typically store customer data and facilitate customer services via a resource record management system. The carriers, such as telecommunication companies providing voice, video, audio, and/or other data services, may associate each node and/or sub-node of the network (e.g., intranet, Internet, etc.) with a resource record. Each resource record provides information relating to a corresponding node location on the network. Nodes and/or sub-nodes include web sites, telephones, fax machines, e-mail addresses, and/or computers.

These resource records may be managed by a domain name system (DNS), which is implemented by domain name servers distributed throughout the network. The DNS is a system that stores information associated with domain names on networks, such as the Internet, in a distributed database located, for example, in the DNS servers. The DNS enables resolution of an internet protocol (IP) address associated with a domain name and contained in a message such as an IP message transmitted in a network such as the Internet. Resource records stored by a DNS server may include human-readable domain names for 32 and/or 128-bit IP addresses (e.g., IPv4 and IPv6, respectively), domain name aliases, mail exchange records, mail exchange server lists for a particular domain, authority records, and/or text records. As networks expand, additional resource records are provisioned or added to a communication system by a network administrator (e.g., a telecommunication service provider) to accommodate new network users and/or customers. However, resource record provisioning is typically tedious, time-consuming, and/or error-prone due to, for example, manual changes or updates that accompany an expansion and/or alteration of the network.

BRIEF DESCRIPTION OF THE DRAWINGS

FIG. 4A is a flowchart representation of machine readable instructions that may be executed to implement the system of FIG. 3A.

FIG. 4B is a flowchart representation of machine readable instructions that may be executed to implement FIG. 4C illustrates an example resource record.

DETAILED DESCRIPTION

Methods and apparatus to provision network resource records will now be disclosed. An example method of provisioning a plurality of resource records in a Telephone Number Mapping (ENUM) system includes receiving first and second inputs to define a range of numbers corresponding to a plurality of resource records, creating an object in a first server to represent the plurality of resource records, and provisioning the plurality of resource records in a second server based on one or more attributes of the object.

Figure 1:
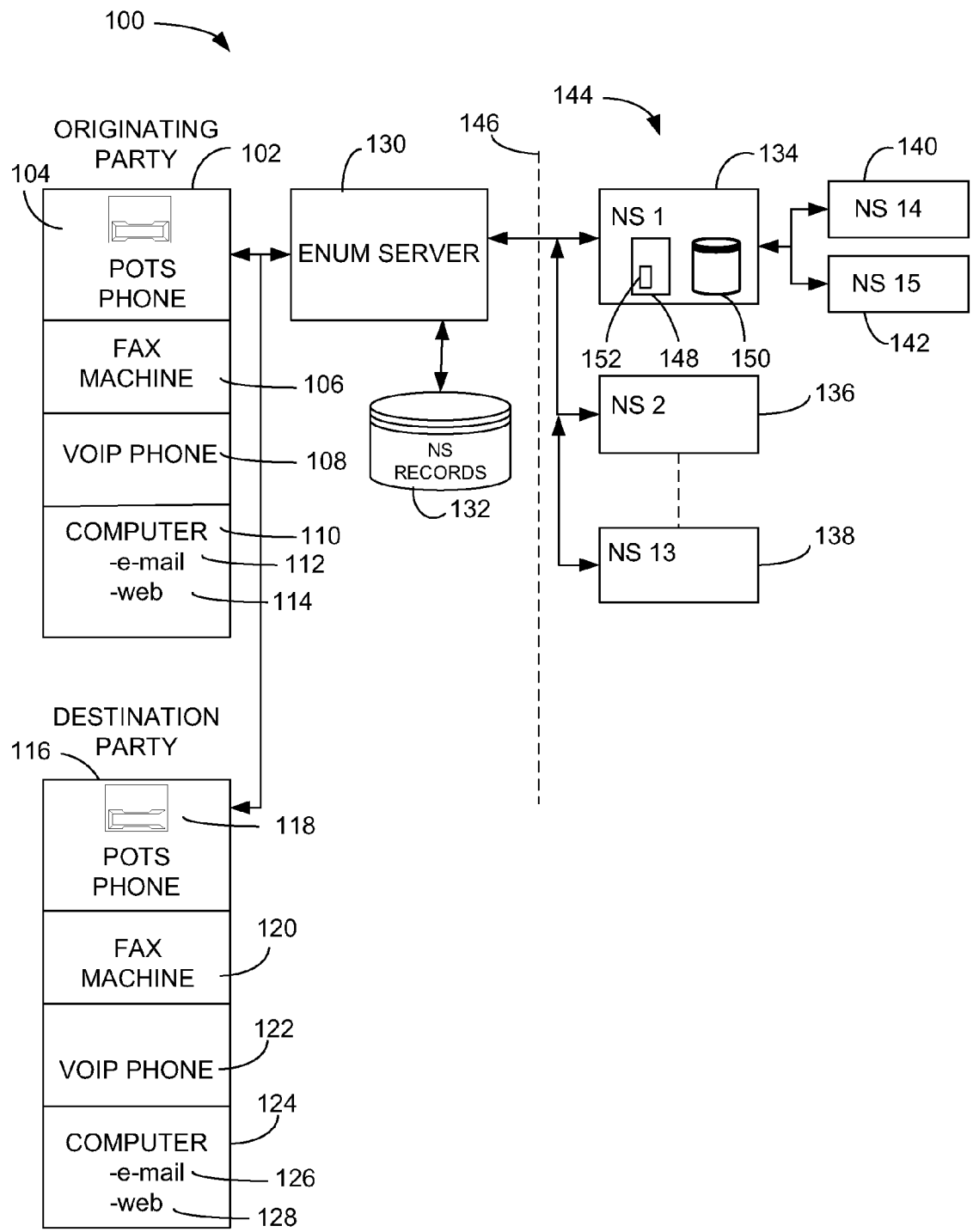
FIG. 1 is a schematic diagram illustrating an example network resource record management system.

An example system 100 to provision network resource records is shown in FIG. 1. The system 100 of the illustrated example updates name servers (e.g., domain name servers of a DNS) with resource records (RRs) based on network changes and/or growth. More specifically, the example system 100 (and the associated example methods described herein) enables automated provisioning of RRs in a server while preserving system capabilities. For example, some RR provisioning methods may direct a server (e.g., a lightweight directory access protocol (LDAP) server) to provision large numbers of RRs without reducing or delegating the other responsibilities of the server. However, provisioning large numbers (e.g., more than 1,000) of RRs may consume significant processing resources, thereby diminishing the overall performance of the server. Among other benefits, the example system 100 alleviates the need to manually edit and/or manage system configurations in response to network growth and/or change. Moreover, the provisioning process may be employed in a more efficient and/or accurate manner than prior art approaches.

In the illustrated example of FIG. 1, an originating party 102 includes a plain old telephone system (POTS) telephone 104, a fax machine 106, a voice over internet protocol (VoIP) telephone 108, and/or a computer 110. The computer 110 of the illustrated example is associated with an email address 112 and/or a web address 114, such as a specific IP address associated with a web page alias. In the example of FIG. 1, a destination party 116 includes similar network devices as the example originating party 102, such as a POTS telephone 118, a fax machine 120, a VoIP telephone 122, and/or a computer 124. The computer 124 of the destination party 116 may be associated with a destination e-mail address 126 and/or a destination web-address 128, such as a specific (IP) address associated with a web-page alias.

While a calling party (e.g., the originating party 102 originating a call to the destination party 116) may have an alias destination identifier, such as a phone number and/or web-page address, such alias destination identifiers are resolved to specific IP addresses before any communicative connection can occur between the originating party 102 and the destination party 116. An alias destination identifier may include a numbering plan area (NPA), which may be, for example, an area code. The alias destination identifier may, additionally or alternatively, include a central office (CO) prefix, such as a three digit number referred to as an NXX. Moreover, the alias destination identifier may include a suffix identifier, which is typically 4 digits for North American telephone numbering systems. Cumulatively, the NPA/NXX/suffix identifier may represent the alias destination identifier of an originating party, which is typically sufficient for POTS telephone calls. While such 10-digit North American telephone numbers are used for conventional POTS telephone calls, some alias destination identifiers may be associated with other devices of a network, such as VoIP telephones, cellular (wireless) telephones, pagers, and/or e-mail addresses, etc. In such circumstances, the alias destination identifier entered by an originating party must be reconciled to determine an associated IP address to accommodate communicative connectivity with one or more other device(s) of the network.

While the concepts described herein may apply to any type of alias destination identifier, such as a phone number, an e-mail address, and/or a web (Internet) address (e.g., a uniform resource identifier (URI)), the following examples will describe alias destination identifiers having an NPA, NXX, and/or suffix. The NPA (e.g., area code) and NXX (e.g., CO prefix) typically represent a geographic area. For example, the NPA "312" represents an area code for the city of Chicago, while the NXX of "580" represents one of many COs within that NPA. An originating party 102 in any locality may attempt to use an alias destination identifier when placing a call to the destination party 116. In the illustrated example, the NPA (and/or NPA plus NXX plus any suffix) is received by a Telephone Number Mapping (ENUM) server 130 to aid customers with enhancing widespread portability of telephone numbers. The ENUM server 130 of the illustrated example maps telephone numbers to IP addresses. More specifically, the ENUM server 130 employs a DNS-based method for mapping telephone numbers to uniform resource identifiers (URIs).

For instance, in an example DNS method, any number can be transformed into a domain name by reversing the numbers, separating them with dots (i.e., periods), and adding a suffix, such as "e164.arpa." Upon receiving a phone number and/or NPA/NXX combination, the ENUM server 130 of the illustrated example queries an ENUM database 132, which contains name-server (NS) records. Specific NS records may exist for every established NPA/NXX variation. As used herein, an NPA, NPA combined with an NXX, and/or NPA/NXX/suffix combination will also be referred to as an "identifier." These NS records point to one or more DNS servers (also referred to as name servers (NSs)). The particular NS pointed to by a given NS record allows specific resource records (RRs) associated with the NPA/NXX variation to be retrieved. Accordingly, if the ENUM server 130 queries the ENUM database 132 regarding a particular identifier and receives a response of "NS 1," then RRs for that identifier are found in NS 1 (134). The example system 100 of FIG. 1 includes NS 1 (134), NS 2 (136), NS 3-NS 12 (not shown), NS 13 (138), NS 14 (140), and NS 15 (142), but any number of NSs may be employed in view of any particular needs of the carrier (e.g., a telecommunication company providing data services). Each of the NSs 134-142 that the carrier employs may reside within a private network 144, illustrated to the right hand side of the dotted line 146 in FIG. 1. As a result, the NSs 134-142, the RRs stored therein, and/or any other data are protected from attacks from a public network, (e.g., a denial of service (DoS) attacks from the Internet).

In the illustrated example of FIG. 1, each of the name servers includes a lightweight directory access protocol (LDAP) server 148 and an LDAP database 150. As described below in connection with FIGS. 3A and 3B, an LDAP object 152 (which may include one or more attributes) may be created and/or stored in the LDAP server 148 (as shown in FIG. 1) and/or the LDAP database 150. Further, as detailed below, such an LDAP object 152 may be conveyed to a name server to provision a range of numbers and/or the associated resource records. While the LDAP server 148 and LDAP database 150 are only shown in NS 1 of FIG. 1, in the example of FIG. 1 all of the NSs 134-142 may include similar components. In other examples, one or more LDAP servers and/or databases may be configured in alternative arrangements (e.g., centralized LDAP servers or NSs) to interact with other components of the DNS.

The LDAP server 148 of the illustrated example employs a standard that defines a manner of organizing directory hierarchies and an interface for clients to access the directory servers. A client of the LDAP server 148 (e.g., the ENUM server 130) may send operation requests to the LDAP server 148. The LDAP server 148 of the illustrated example will send corresponding responses back to the client based on data contained within the LDAP database 150. Requests to the LDAP server 148 may include, but are not limited to, bind requests, transport layer security (TLS) initiation requests, searches, compares, adds, deletes, modifications, and/or unbind requests to close a connection.

In the illustrated example, additional NSs may be added to existing NSs in a horizontal manner to accommodate for network/subscriber growth. Therefore, if requested information is not available in the additional NS (e.g., NS 1), then the NS 1 (134) may query a child NS, such as NS 14 (140) and/or NS 15 (142) to obtain the destination address. In other words, when requested information is not found in a parent NS, such as NS 1 (134), then the parent automatically routes the LDAP server request to one or more child NSs (if present) to request resource record information for the particular identifier. If no such information is available, even after a query down all NSs of the family, then the parent NS communicates the lack of such information to the ENUM server 130, which in turn, informs the originating party 102 that their call should be completed via, for example, the POTS system rather than via the DNS-based system (e.g., the Internet). On the other hand, if any name server contains specific information associated with the particular identifier, then that information (e.g., a resource record) is returned to the originating party 102 so that their communication may be completed to the specific IP address of the destination party 116.

Figure 2A:
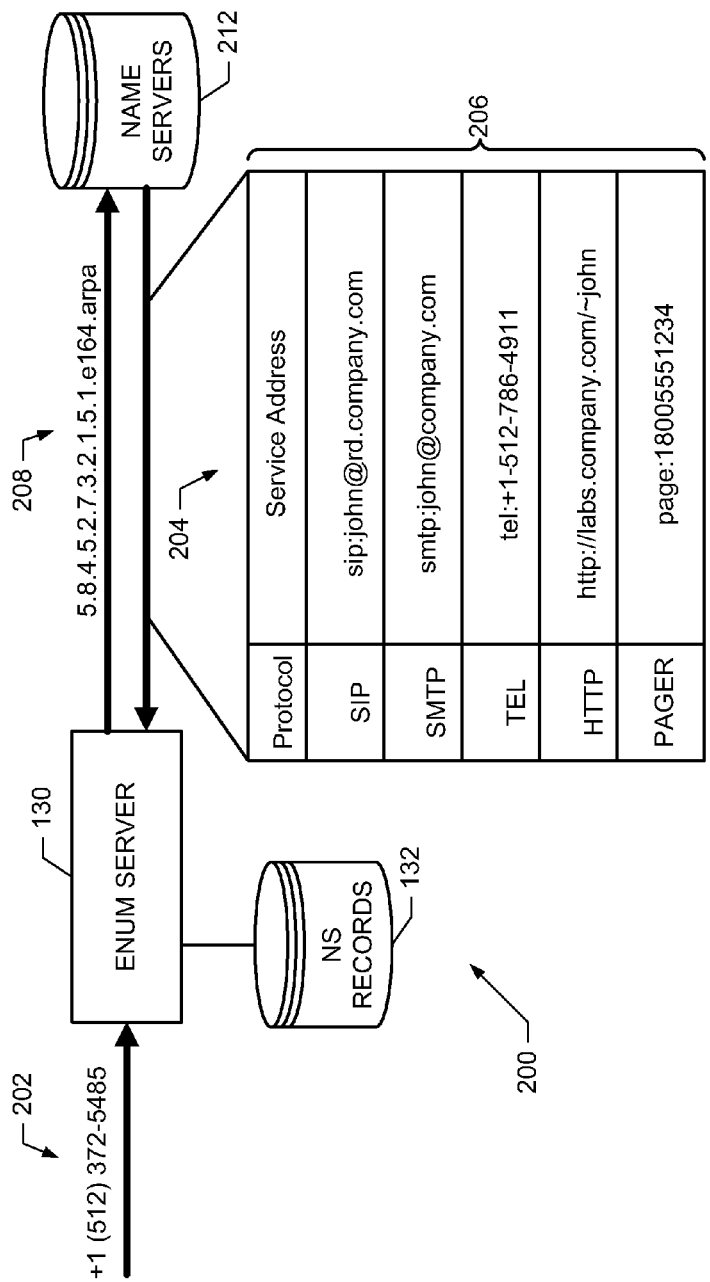
FIG. 2A illustrates an example exchange of information between components of the example system of FIG. 1.

FIG. 2A illustrates an example exchange of information 200 between a subset of the example components of FIG. 1. In the illustrated example, ENUM server 130 of the example exchange 200 receives a query 202 (e.g., such as a query from the originating party 102 of FIG. 1) and transforms the query 202 into a suitable internet domain name 208. In the illustrated example of FIG. 2A, the query 202 includes an E.164 telephone number (+1 512-372-5485) which is transformed to an internet domain name (e.g., by reversing the number, adding periods between each digit, and appending e.164.arpa). The ENUM server 130 may route the domain name 208 to the one or more NSs 212 (e.g., the collection of NSs and LDAP servers as described in FIG. 1) based on information returned from the ENUM database 132 that contains NS records. More specifically, the ENUM server 130 requests that any naming resource records associated with the identifier (i.e., the domain name 208) be returned by the NSs 212. As shown in the example of FIG. 2A, the requested resource records are naming authority pointer (NAPTR) records. Generally speaking, a NAPTR record is a type of resource record that identifies one or more URIs associated with a domain name. The set of URIs 206 in the illustrated example of FIG. 2A represents a set of one or more network addresses at which an entity (e.g., employee) may be reached (e.g., placed in communication with the originating party). As described below in connection with FIG. 2B, a NAPTR record 204 may indicate a preferred method or location of contact (e.g., the NAPTR record may indicate that a person prefers to be emailed rather than faxed information).

If the resource record information is available in the addressed NSs 212, it will be returned to the ENUM server 130 to allow the originating party (e.g., the originating party 102 of FIG. 1) to set up a communication session using the newly discovered IP address of the destination party. As shown in FIG. 2A, the example NAPTR records 204 that are returned to the ENUM server 130 may include addresses (e.g., the set of URIs 206) at which the associated entity may be reached (e.g., linked) via various protocols or standards including, for example, session initiation protocol (SIP), simple mail transfer protocol (SMTP), hypertext transfer protocol (HTTP), etc.

Figure 2B:
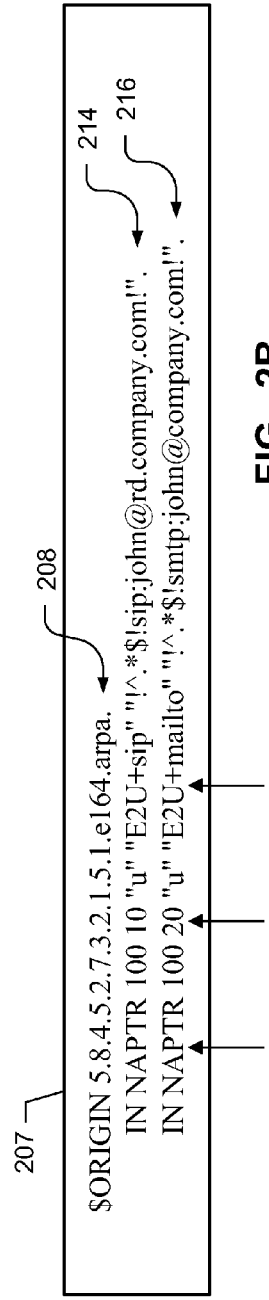
FIG. 2B shows an example configuration of a naming authority pointer record.

While FIG. 2A illustrates a representation of the possible information that may be contained in a NAPTR record, FIG. 2B shows the BIND (Berkeley Internet Domain Name) configuration for a portion of an example NAPTR record 207. In this example, the query of '5.8.4.5.2.7.3.2.1.5.1.e164.arpa' 208 may return the URI 'sip:john@rd.company.com' 214, indicating that a network session may be initiated with 'john@rd.company.com' in response to the query 208. Further, the query 208 may return 'smtp:john@company.com' 216, indicating that an email may be sent to 'john@company.com' in response to the query 208. Moreover, a preference field 218 may indicate a preference order method of contact. In the illustrated example, the preference field value of the sip URI 214 is "10." Therefore, the sip URI 214 takes precedence over the smtp URI 216, which has a preference field value of "20." Among other fields, the NAPTR record 207 may also include a resolution service and protocol field 220 and a type of query field 222. In the illustrated example of FIG. 2B, the resolution service and protocol field 220 indicates that the resolution service is E.164 to URI (E2U), and the protocol may be sip or mailto. The contents of the type of query field 222 correspond to a NAPTR record. As noted above, such a record or BIND configuration may include additional fields. Further, the NAPTR records listed above may include additional and/or alternative URIs. The NAPTR records shown herein are provided for illustrative purposes. Similarly, the BIND configuration shown above is included for illustrative purposes, as the NAPTR records may be configured in other manners or languages. As described below in connection with FIGS. 3A, 3B, and 4, an LDAP object may be created (e.g., in a name server or an LDAP server) that represents a range of resource records to be bulk loaded into a DNS system. In some examples, the resource records include the NAPTR records, as described above. Thus, the example LDAP object may be generated to conform with the NAPTR configuration described in FIGS. 2A and 2B.

Figure 3A:
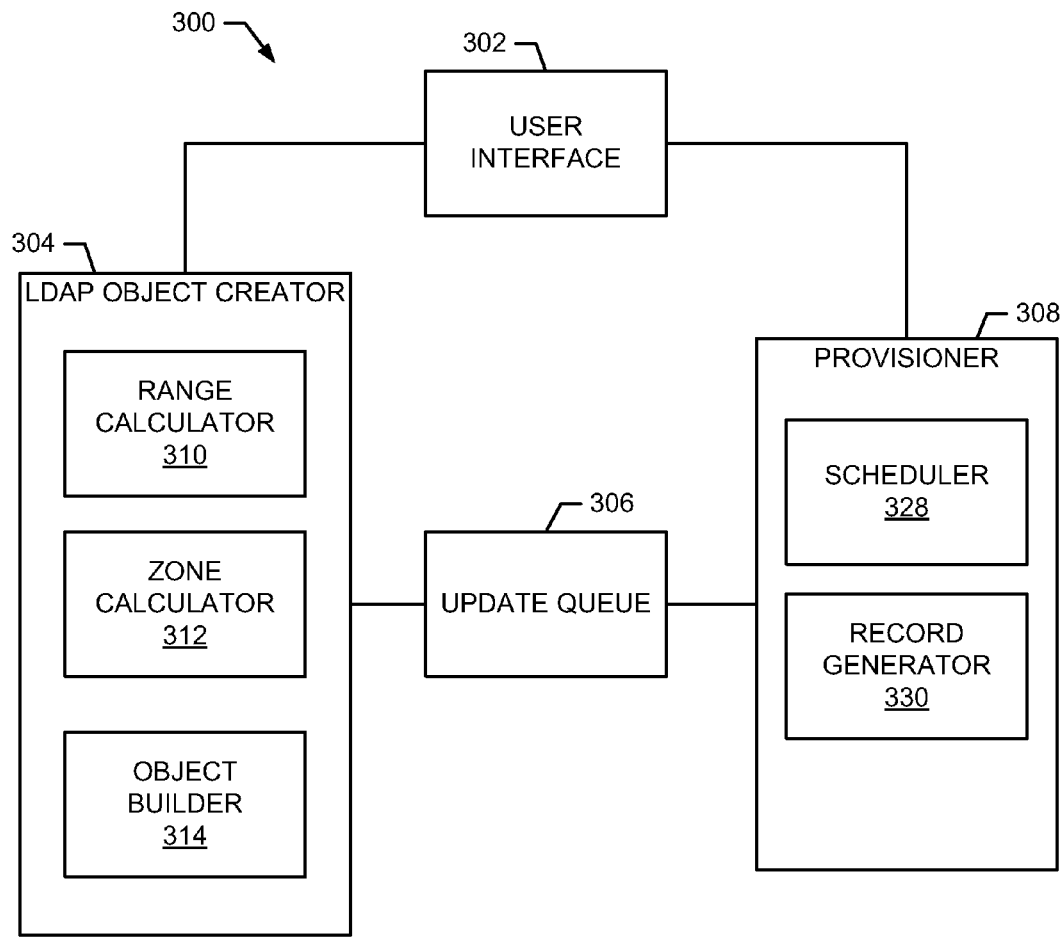
FIG. 3A is an example system to provision network resource records.

FIG. 3A illustrates an example system 300 to provision network resource records in, for example, the system 100 of FIG. 1. Generally, the system 300 creates one or more LDAP objects, each having all of the information (e.g., contained in object attributes) necessary to provision a plurality (e.g., ten thousand) of resource records in a server (e.g., a name server). An attribute is a characteristic or property of an object (e.g., an object defined by a class in object-oriented programming) that may be manipulated and/or created by a user (e.g., a programmer) and typically includes a name and a corresponding value. Typically, an object includes a plurality of attributes that describe different aspects of the object. For example, a line object may have a thickness attribute having a value of 1 or 3. In the context of a domain name system, an object may contain attributes corresponding to locations (e.g., IP address), people, and/or resource records. The LDAP object (e.g., the LDAP object 152 of FIG. 1) described herein may include one or more attributes, representing a plurality of resource records, that may be utilized to provision large number of resource records (e.g., the NAPTR records described above in connection with FIGS. 2A and 2B) in a server (e.g., a name server).

A carrier may provide services based on a numbering plan area (NPA), and/or an exchange (NXX). The carrier may define network zones according to a combination of the NPA and NXX and/or some subset thereof. Where a large amount of new numbers or updates are to be provisioned, zone breaks within the new range of numbers or among the existing numbers may create a need to edit and/or reconfigure zone files on an associated name server. Typically, such edits are done manually and/or may be tedious, error-prone tasks. For example, the carrier may attempt to provision 10,000 numbers for a particular NPA-NXX (e.g., a zone), such as 312-580-0000 through 312-580-9999. However, the carrier may not be aware of the status (e.g., currently assigned and/or used by a subscriber) of each number within the NPA-NXX, particularly if the selected NPA-NXX has been partially used for some time. In the event that the carrier provisions the entire block of 10,000 numbers, then existing clients that already use and/or have rights to one or more numbers will suffer a loss of service. One or more zone breaks may exist within the 10,000 number block that represent, for example, one or more numbers already allocated to one or more clients/subscribers. Zone breaks may exist based on, for example, a company reserving a block of numbers to accommodate a sales force, one or more offices, a bank of fax machines, etc. While all of the block of numbers may not be currently utilized by the example company, such numbers may be invoked for service(s) in the future when or if necessary as the company expands. The example system 300 described herein alleviates these and other problems by enabling an automated mass or bulk provisioning of resource records The example system 300 includes a user interface 302 to receive inputs from a user (e.g., a system administrator, designer, programmer, a system engineer, etc.), an LDAP object creator 304, an update queue 306, and a provisioner 308. A web interface or any other suitable form may be used to prompt the user to enter the inputs via the user interface 302. In other examples, the inputs may, alternatively or additionally, be entered by a system or computing process (e.g., without a user command) in response to the detection of a program state or output. The inputs may include a base number, a quantity of numbers to be provisioned, and/or a regex (regular expression). The base number may be, for example, a ten-digit string beginning with a NPA-NXX combination and ending with four zeroes (e.g., 2017100000). In the illustrated example of FIG. 3A, zone breaks (e.g., breaks in the organization or directory structure of LDAP or NS servers) occur at each NPA-NXX. The quantity of numbers may be, for example, ten thousand (10,000), representing the 10,000 possible telephone numbers of the zone defined by the NPA-NXX combination (i.e., 201-710-0000 through 201-710-9999). The regex input may be, for example, a string associated with a type of URI (e.g., 'sip:+@ims.att.com').

Figure 3B:
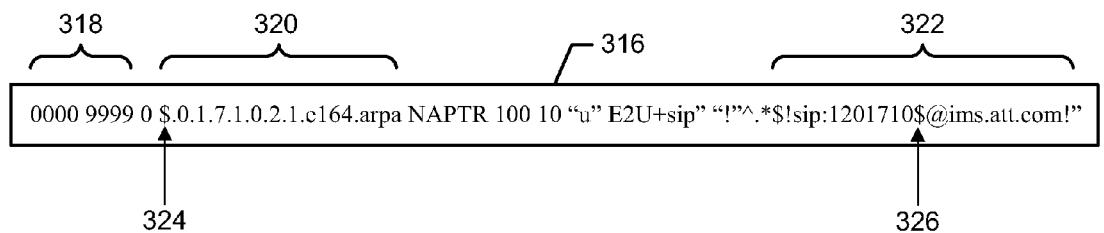
FIG. 3B shows an example lightweight directory access protocol object.

The inputs received via the user interface 302 may be conveyed to the LDAP object creator 304. The LDAP object creator 304 of the illustrated example includes a range calculator 310, a zone calculator 312, and an object builder 314. The range calculator 310 of the illustrated example uses the inputs to determine how many numbers are to be provisioned. As described in detail below, the zone calculator 312 of the illustrated example uses the inputs and, perhaps, existing records to determine the one or more zones that are necessary to accommodate the range of numbers. The object builder 314 of the illustrated example uses the results of the range calculation and/or zone calculation and the regex input to build, for example, a generate statement that represents the resource records that correspond to the numbers to be provisioned. Generally speaking, the LDAP object (and the associated generate statement) may act as a template for creating the plurality of resource records the LDAP object represents. Specifically, FIG. 3B shows an example LDAP object 316, which includes all of the information necessary to provision a plurality of resource records corresponding to the inputs entered in the user interface 302. The example LDAP object 316 may include a range 318 (e.g., from the range calculator 310), a domain name segment 320, and a URI segment 322. The domain name segment 320 and the URI segment 322 respectively include variables 324 and 326 that the provisioner 308 may replace with specific values based on an iteration. As described below in connection with FIGS. 4A and 4B, the numbered portion of the domain name segment 320 and the URI segment 324 may correspond to a zone name (i.e., a zone definition). The LDAP object 316 may further include additional and/or alternative fields (e.g., a resolution service and/or protocol indicators as shown in FIG. 3B) in other examples.

In some examples, the update queue 306 receives information or data created by or passing through the LDAP object creator 304. In such a case, the update queue 306 receives an LDAP object (e.g., the LDAP object 316 of FIG. 3B) to be temporarily stored before being conveyed to the provisioner 308. In other examples, an LDAP object is conveyed directly to the provisioner 308 from the LDAP object creator 304 (e.g., after being temporarily stored in the LDAP object creator 304). The provisioner 308 of the illustrated example includes a scheduler 328 to handle, for example, how and when the update queue 306 may be polled for new objects. Additionally or alternatively, the scheduler 328 may establish periodic polling of the update queue 306 and/or the LDAP object creator 304. Further, the provisioner 308 of the illustrated example includes a record generator 330, which is responsible for creating the resource records represented by the LDAP objects and the associated attributes. For example, referring to FIG. 3B, the record generator 330, may iterate through the range of numbers (indicated in the range field 318) while building a resource record for each number in the range. The variables 324 and 326 of the example LDAP object 316 may be replaced by a value corresponding to a current iteration, as further described in connection with FIG. 4. Each iteration produces a fully operational resource record, thereby automatically creating the plurality of resource records represented by the LDAP object.

In some examples, the LDAP object creator 304 and its components are located in an LDAP server (e.g., the LDAP server 148 of FIG. 1) and/or database (e.g., the LDAP database 150 of FIG. 1), while the provisioner 308 is located in a name server (e.g., the name server 134 of FIG. 1). In other examples, the LDAP object creator 304 and the provisioner 308 is located in a common server (e.g., a name server or LDAP server) or database. Moreover, the update queue 306 and the user interface 302 may be implemented in any desired location, including in an LDAP server, in a name server, and/or in an ENUM server.

FIG. 4A represents example machine readable instructions 400 that may be executed to implement the example system of FIG. 3A. The example instructions 400 begin in response to an initialization of a provisioning tool by an administrator, programmer, engineer, system process, etc. (block 402). Such a provisioning tool may include a user interface (e.g., the user interface 302 of FIG. 3A) that prompts the user for one or more inputs (block 404). The inputs may include a base number, a quantity of numbers to be provisioned, and/or a regex (regular expression). Using the inputs, the example range calculator 310 may then calculates the range of numbers to be provisioned (block 406) and the zone calculator 312 defines the corresponding zones necessary to accommodate the range (block 408). The range may be calculated by, for example, adding the base number and the quantity of numbers to be provisioned. In some examples, zone breaks may be defined based on each NPA-NXX combination or a subset thereof. In such a case, to define the zones, the zone calculator 312 may break the base number into component parts to isolate the NPA and/or NXX portions of the number or a combination thereof. The isolated NPA-NXX combination may be reversed and dots (e.g., periods) may be inserted between each digit of the reversed NPA-NXX combination. Further, the zone calculator 32 may append a string to indicate a domain (e.g., '1.e164.arpa') to complete the definition of the zone. Thus, the zone calculator 312 assigns a zone name to a plurality of numbers to be provisioned based on the reversed, string appended NPA-NXX combination. Referring to the example of FIG. 4C, where the inputted base number is '210710000,' the corresponding defined zone name is '0.1.7.1.0.2.1.e164.arpa' (including a '1' to the right of the '2' due to the country code).

With one or more zones defined, the example object builder 314 creates an LDAP object having attributes corresponding to the information associated with the one or more zones (e.g., the calculated range, the assigned zone name, the string from the regex, etc.) (block 410). Where more than one zone is needed to provision the range of numbers, the object builder 314 creates additional LDAP objects with attributes corresponding to the additional zones. As described above, in some examples, the LDAP object may be created in the LDAP server and the LDAP object may act as a template for creating resource records in a server (e.g., a name server).

The example LDAP object creator 304 (e.g., via the object builder 314) then alerts or informs the system or a component thereof (e.g., a name server) that a new LDAP object has been created (block 412). For example, where the LDAP objects are created in an LDAP server and the resource records are to be provisioned in a corresponding name server, a signal may be generated to trigger one or more name servers to inspect (e.g., via a comparison of contents) an LDAP server and/or database for objects that are not currently located in the name server. Additionally or alternatively, the example name servers (e.g., the example name servers NS 1 through NS 15 of FIG. 1) may check the LDAP servers and/or databases for newly created objects (e.g., via a flag or time stamp added to each new object) on a periodic basis, an aperiodic, a scheduled basis, and/or upon a user request(s). Moreover, the example LDAP object creator 304 may employ an update queue (e.g., the update queue 306 of FIG. 3A) to store LDAP objects. In such implementations, the queue 306 is polled by a name server for newly created content.

Upon detection of new data (e.g., a newly created LDAP object), the new LDAP object(s) of the illustrated example are conveyed to one or more locations that contain and/or include a provisioner (e.g., the example provisioner 308 of FIG. 3A) (block 414). The provisioner 308 then uses the LDAP object(s) to create a plurality of resource records (e.g., NAPTR records) (block 416). FIG. 4B represents example machine readable instructions 418 that may be executed to implement the creation of the plurality of resource records (e.g., the instructions represented by block 416 of FIG. 4A).

The example instructions 418 begin in response to a conveyance of the LDAP object to a name server (block 420). The provisioner 308 (e.g., via the record generator 330) may iterate through the range of numbers (indicated in an attribute of the LDAP object) to build a resource record for each number in the range (block 422). Referring to the example LDAP object listed above in FIG. 3B, during each iteration, the variable 324 (i.e., the '$') in the domain name field 320 is replaced by a reversed, dotted version of a 4-digit suffix represented by the current number of that iteration (block 424). Further, the variable 326 (i.e., the '$') in the URI field 322 is replaced by the 4-digit suffix represented by the current number of that iteration (block 426). For example, using the example of FIG. 3B, an example resource record 428 resulting from the sixth iteration of the process represented by block 416 is illustrated in FIG. 4C. Thus, each iteration produces a fully operational resource record, thereby creating the plurality of resource records represented by the LDAP object. As described above, these resource records can be utilized to place one or more parties in communication over a network via a telephone mapping system.

Figure 5:
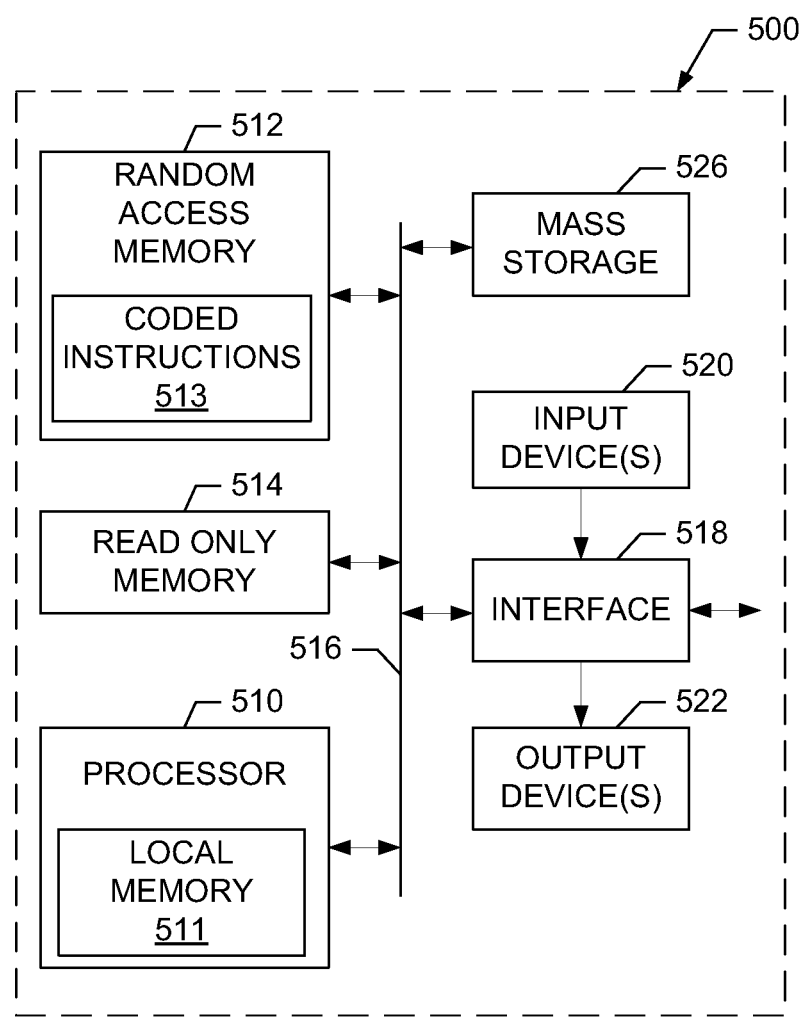
FIG. 5 is a schematic illustration of an example processor platform which may execute the example machine readable instructions of FIG. 4A to implement the example system of FIG. 3A.

FIG. 5 is a block diagram of an example processor platform 500 capable of executing the machine readable instructions represented by FIGS. 4A and 4B to implement the apparatus and/or methods disclosed herein. The processor platform 500 can be, for example, a server, a personal computer, a laptop, a PDA, or any other type of computing device.

The processor platform 500 of the instant example includes a processor 510 such as a general purpose programmable processor. The processor 510 includes a local memory 511, and executes coded instructions 513 present in the local memory 511 and/or in another memory device. The processor 510 may execute, among other things, the example process illustrated in FIG. 3. The processor 510 may be any type of processing unit, such as a microprocessor from the Intel® Centrino® family of microprocessors, the Intel® Pentium® family of microprocessors, the Intel® Itanium® family of microprocessors, the Intel XScale® family of processors, and/or the Motorola® family of processors. Of course, other processors from other families are also appropriate.

The processor 510 is in communication with a main memory including a volatile memory 512 and a non-volatile memory 514 via a bus 516. The volatile memory 512 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 514 may be implemented by flash memory and/or any other desired type of memory device. Access to the main memory 512, 514 is typically controlled by a memory controller (not shown).

The processor platform 500 also includes an interface circuit 518. The interface circuit 518 may be implemented by any type of interface standard, such as an Ethernet interface, a universal serial bus (USB), and/or a third generation input/output (3GIO) interface.

One or more input devices 520 are connected to the interface circuit 518. The input device(s) 520 permit a user to enter data and commands into the processor 510. The input device(s) can be implemented by, for example, a keyboard, a mouse, a touchscreen, a track-pad, a trackball, isopoint and/or a voice recognition system.

One or more output devices 522 are also connected to the interface circuit 518. The output devices 522 can be implemented, for example, by display devices (e.g., a liquid crystal display, a cathode ray tube display (CRT), a printer and/or speakers). The interface circuit 518 may, thus, typically include a graphics driver card.

The interface circuit 518 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processor platform 500 also includes one or more mass storage devices 526 for storing software and data. Examples of such mass storage devices 526 include floppy disk drives, hard drive disks, compact disk drives and digital versatile disk (DVD) drives. The mass storage device 526, for example, may implement the example databases described above.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
    creating a statement representative of a plurality of numbers to be provisioned to a plurality of users via an iterative process; and
    for each iteration of the iterative process, generating an instance of the statement to form a resource record by:
        replacing a first character in a domain name segment of the statement with a first version of a respective one of the numbers;
        replacing a second character in a resource identifier segment of the statement with a second version of the respective one of the numbers different than the first version; and
        storing the instance of the statement as a resource record in connection with the respective one of the numbers.

2. A method as defined in claim 1, wherein the first version of the respective one of the numbers comprises a reversed version of the respective one of the numbers.

3. A method as defined in claim 1, wherein creating the statement includes defining a number range attribute to include the plurality of numbers.

4. A method as defined in claim 1, wherein a portion of the domain name segment corresponds to a zone name.

5. A method as defined in claim 1, wherein a portion of the resource identifier segment corresponds to a zone name.

6. A method as defined in claim 1, wherein the statement is associated with a lightweight directory access protocol object.

7. A method as defined in claim 1, further comprising defining the plurality of numbers based on a base telephone number and a quantity of desired available telephone numbers.

8. A tangible computer readable storage medium comprising instructions that, when executed, cause a machine to perform operations comprising:
    creating a statement representative of a plurality of numbers to be provisioned to a plurality of users via an iterative process; and
    for each iteration of the iterative process, generating an instance of the statement to form a resource record by:
        replacing a first character in a domain name segment of the statement with a first version of a respective one of the numbers;
        replacing a second character in a resource identifier segment of the statement with a second version of the respective one of the numbers different than the first version; and
        storing the instance of the statement as a resource record in connection with the respective one of the numbers.

9. A storage medium as defined in claim 8, wherein the first version of the respective one of the numbers comprises a reversed version of the respective one of the numbers.

10. A storage medium as defined in claim 8, wherein creating the statement includes defining a number range attribute to include the plurality of numbers.

11. A storage medium as defined in claim 8, wherein a portion of the domain name segment corresponds to a zone name.

12. A storage medium as defined in claim 8, wherein a portion of the resource identifier segment corresponds to a zone name.

13. A storage medium as defined in claim 8, wherein the statement is associated with a lightweight directory access protocol object.

14. A storage medium as defined in claim 8, wherein the instructions are to cause the machine to define the plurality of numbers based on a base telephone number and a quantity of desired available telephone numbers.

15. An apparatus comprising:
    a memory storing machine readable instructions; and
    a processor to execute the instructions to:
        create a statement representative of a plurality of numbers to be provisioned to a plurality of users via an iterative process; and
        for each iteration of the iterative process, generate an instance of the statement to form a resource record by:
            replacing a first character in a domain name segment of the statement with a first version of a respective one of the numbers;
            replacing a second character in a resource identifier segment of the statement with a second version of the respective one of the numbers different than the first version; and
            storing the instance of the statement as a resource record in connection with the respective one of the numbers.

16. An apparatus as defined in claim 15, wherein the first version of the respective one of the numbers comprises a reversed version of the respective one of the numbers.

17. An apparatus as defined in claim 15, wherein creating the statement includes defining a number range attribute to include the plurality of numbers.

18. An apparatus as defined in claim 15, wherein a portion of the domain name segment corresponds to a zone name.

19. An apparatus as defined in claim 15, wherein a portion of the resource identifier segment corresponds to a zone name.

20. An apparatus as defined in claim 15, wherein the statement is associated with a lightweight directory access protocol object.

* * * * *